United States Patent
Kim

(10) Patent No.: US 9,738,171 B2
(45) Date of Patent: Aug. 22, 2017

(54) METHOD AND APPARATUS FOR DETECTING CHARGER AND METHOD OF OPERATING THE CHARGER

(71) Applicant: Hyundai Motor Company, Seoul (KR)

(72) Inventor: Do Hoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 14/836,337

(22) Filed: Aug. 26, 2015

(65) Prior Publication Data

US 2016/0059725 A1    Mar. 3, 2016

(30) Foreign Application Priority Data

Aug. 27, 2014    (KR) .................. 10-2014-0112548

(51) Int. Cl.

| | |
|---|---|
| *B60L 11/18* | (2006.01) |
| *H04B 5/00* | (2006.01) |
| *H02J 50/80* | (2016.01) |
| *H02J 50/40* | (2016.01) |
| *G01V 3/10* | (2006.01) |

(52) U.S. Cl.
CPC ......... *B60L 11/1848* (2013.01); *B60L 11/182* (2013.01); *B60L 11/1809* (2013.01); *G01V 3/10* (2013.01); *H02J 50/40* (2016.02); *H02J 50/80* (2016.02); *H04B 5/0037* (2013.01); *H04B 5/0081* (2013.01)

(58) Field of Classification Search
CPC  B60L 11/1806; B60L 11/182; B60L 11/1848; H02J 50/40; H02J 50/80

USPC .......................................................... 320/108
See application file for complete search history.

(56) References Cited

U.S. PATENT DOCUMENTS

| | | | |
|---|---|---|---|
| 8,519,569 B2 * | 8/2013 | Shimokawa .......... | B60L 11/182 307/104 |
| 2014/0191568 A1 * | 7/2014 | Partovi ................... | H02J 7/025 307/9.1 |
| 2014/0223217 A1 * | 8/2014 | Nabhane et al. ....... | G05F 1/625 713/340 |
| 2016/0059721 A1 * | 3/2016 | Suffield et al. ......... | B60L 11/14 340/455 |
| 2016/0061982 A1 * | 3/2016 | Kim ..................... | H04B 5/0037 324/207.16 |

(Continued)

*Primary Examiner* — Sun Lin

(74) *Attorney, Agent, or Firm* — Mintz Levin Cohn Ferris Glovsky and Popeo, P.C.; Peter F. Corless

(57) ABSTRACT

Provided are a method and an apparatus for detecting a charger for a designated vehicle based on the circumstances including a plurality of chargers in a charging station. Also, provided is a method of operating the charger using the method or the apparatus. The method of detecting one charger of the chargers in the charging station and a transmitting pad connected to the chargers in the charging station using a charger detection apparatus loaded in a vehicle, comprises transmitting a detection inducing signal through a receiving pad loaded in the designated vehicle for wireless charging, receiving pieces of sensing signal information on the detection inducing signal received at a plurality of transmitting pads of at least one charger in the charging station from the at least one charger, and detecting one of a first charger having a preset priority among the at least one charger and the plurality of transmitting pads and a first transmitting pad connected to the first charger by comparing the pieces of sensing signal information.

20 Claims, 9 Drawing Sheets

(56) References Cited

U.S. PATENT DOCUMENTS

2016/0075242 A1* 3/2016 Kim et al. .......... B60L 11/1809
320/109

* cited by examiner

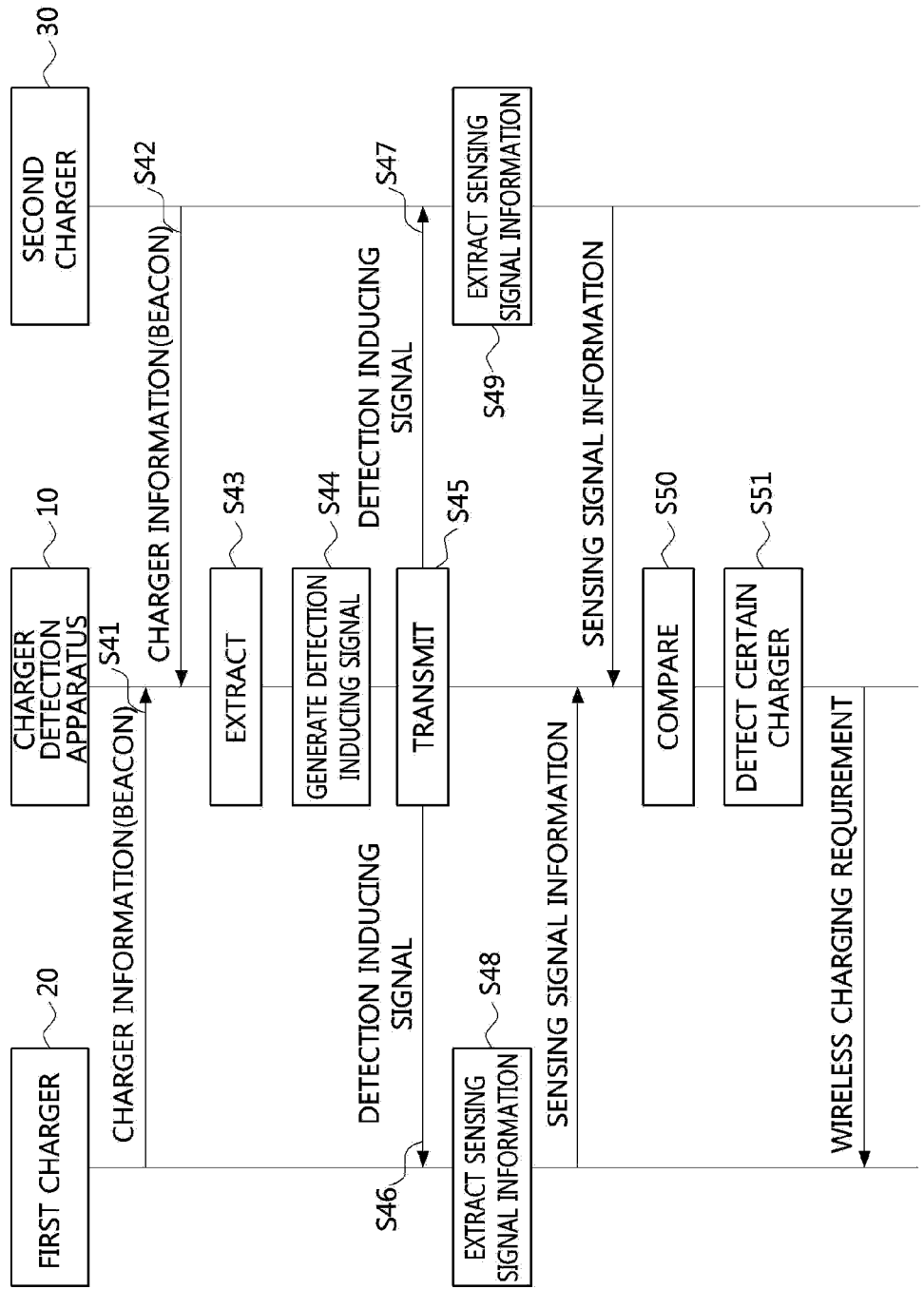

METHOD AND APPARATUS FOR DETECTING CHARGER AND METHOD OF OPERATING THE CHARGER

CLAIM FOR PRIORITY

This application claims priority to Korean Patent Application No. 2014-0112548 filed on Aug. 27, 2014 in the Korean Intellectual Property Office (KIPO), the entire contents of which are hereby incorporated by reference.

BACKGROUND

1. Technical Field

The present invention relates to a method for detecting a charger, and more particularly, to a method and an apparatus for detecting a charger for a designated vehicle based on the circumstances, such as the number of chargers, and to a method of operating the charger using the method or the apparatus.

2. Related Art

Recently, technology related to plug-in hybrid vehicles and electric vehicles has rapidly developed. Some or all of driving force for these vehicles is electric energy. Both wired and wireless charging methods for the plug-in hybrid and electric vehicles have been developed.

Currently, a vehicle may recognize a wireless charger in the vicinity of (e.g., near) the vehicle when the vehicle approaches a wireless charger. However, a vehicle may not select and use a specific charger or charging pad when a plurality of chargers or charging pads are available.

SUMMARY

Accordingly, example embodiments of the present invention are provided to substantially obviate one or more problems due to limitations and disadvantages of the related art.

Example embodiments of the present invention provide a method of detecting a charger, capable of detecting a charger or transmitting pad appropriate for a vehicle in a charging station provided with a plurality of chargers or a plurality of transmitting pads.

Example embodiments of the present invention also provide a charger detection apparatus capable of detecting a charger or transmitting pad appropriate for a vehicle to be wirelessly charged among one or more chargers or a plurality of transmitting pads located in a charging station.

Example embodiments of the present invention also provide a method of operating a charger, which supports a charger detection apparatus of a vehicle to detect an appropriate charger or transmitting pad, in line with the charger detection apparatus.

In some example embodiments, a method of detecting one of chargers and a transmitting pad connected to the chargers in a charging station in a charger detection apparatus loaded in a vehicle, the method comprises transmitting a detection inducing signal through a receiving pad for wireless charging loaded in the vehicle, receiving pieces of sensing signal information on the detection inducing signal received at a plurality of transmitting pads of at least one charger in the charging station from the at least one charger, and detecting one of a first charger having a preset priority among the at least one charger and the plurality of transmitting pads and a first transmitting pad connected to the first charger by comparing the pieces of sensing signal information.

Here, in the transmitting of the detection inducing signal, a signal generation portion connected to the receiving pad uses a receiving coil of the receiving pad as a wireless communication antenna. A level of the detection inducing signal may be smaller than that of a lowest rated current induced by the receiving pad while wireless charging.

Here, in the transmitting of the detection inducing signal, the transmitting of the detection inducing signal for a first time is repetitively performed a plurality of times in a second time cycle longer than the first time.

Here, the method may further comprises, before the detecting of one of the first charger and the first transmitting pad, receiving, by a searching portion of the charger detection apparatus, a beacon signal from the at least one charger. The beacon signal may comprise charger information and the charger information may comprise identification information and availability information on one of the at least one charger and the plurality of transmitting pads.

Here, the method may further comprises, before the detecting of one of the first charger and the first transmitting pad, transmitting, by the searching portion of the charger detection apparatus, a searching request signal to one of the at least one charger and the plurality of transmitting pads located in one of a service area and a network in the charging station, and receiving a searching response signal for the searching request signal from the at least one charger. The searching response signal may comprise charger information, and the charger information comprises identification information and availability information on one of the at least one charger and the plurality of transmitting pads.

Here, the priority may comprise a first serial number among priority serial numbers given to the plurality of transmitting pads in real time.

Here, the method may further comprise, after the detecting of one of the first charger and the first transmitting pad, transmitting a wireless charging requirement of the receiving pad to the first charger.

In other example embodiments, a charger detection apparatus may comprise a signal generation portion which transmits a detection inducing signal through a receiving pad for wireless charging loaded in a vehicle, a receiving portion which receives pieces of sensing signal information on the detection inducing signal received at a plurality of transmitting pads of at least one charger in a charging station from the at least one charger, and a detection portion which detects one of a first charger having a preset priority among the at least one charger and the plurality of transmitting pads or a first transmitting pad connected to the first charger by comparing the pieces of sensing signal information.

Here, the signal generation portion uses a receiving coil of the receiving pad as a wireless communication antenna. A level of the detection inducing signal may be smaller than that of a lowest rated current induced by the receiving pad while wireless charging.

Here, the signal generation portion may repetitively perform the transmitting of the detection inducing signal for a first time a plurality of times in a second time cycle longer than the first time.

Here, the apparatus may further comprise a searching portion which receives a beacon signal from the at least one charger. The beacon signal may comprise charger information, and the charger information may comprise identification information and availability information on one of the at least one charger and the plurality of transmitting pads.

Here, the apparatus may further comprise a searching portion which transmits a searching request signal to one of the at least one charger and the plurality of transmitting pads located in one of a service area and a network in the charging station and receives a searching response signal for the searching request signal from the at least one charger. The searching response signal may comprise charger information, and the charger information comprises identification information and availability information on one of the at least one charger and the plurality of transmitting pads.

Here, the priority may be determined based on availability information and signal-receiving intensity of one of the charger and the transmitting pads in the sensing signal information.

Here, the apparatus may further comprise a transmission portion which transmits a wireless charging requirement of the receiving pad to the first charger after one of the first charger and the first transmitting pad is detected.

In other example embodiments, a charger operating method, performed by each of chargers in a charging station, may comprise receiving, by at least one transmitting pad connected to the charger, a detection inducing signal from a receiving pad for wireless charging loaded in a vehicle, generating sensing signal information on the detection inducing signal to support detecting one of a first charger having a preset priority among at least one charger and a plurality of transmitting pads in the charging station and a first transmitting pad connected to the first charger, and transmitting the sensing signal information to a charger detection apparatus loaded in the vehicle.

Here, the method may further comprise, before the receiving of the detection inducing signal, transmitting a beacon signal which comprises charger information. The beacon signal may comprise charger information, and the charger information comprises identification information and availability information on one of the at least one charger and the plurality of transmitting pads.

Here, the method may further comprise, before the receiving of the detection inducing signal, receiving a searching request signal from the charger detection apparatus located in one of a service area and a network in the charging station, and transmitting a searching response signal for the searching request signal to the charger detection apparatus. The searching response signal may comprise charger information, and the charger information comprises identification information and availability information on one of the at least one charger and the plurality of transmitting pads.

Here, in the receiving of the detection inducing signal, one of a current and a voltage induced by the transmitting pad may be measured. A level of the detection inducing signal may be smaller than a level of a lowest rated normal current supplied to the transmitting pad while wireless charging.

Here, in the receiving of the detection inducing signal, the receiving of the detection inducing signal for a first time may be repetitively performed a plurality of times in a second time cycle. The sensing signal information comprises one of an average and a weighted average of a plurality of received detection inducing signals.

Here, the method may further comprise, after the transmitting of the detection signal information, receiving a message comprising a wireless charging requirement of the receiving pad from the charger detection apparatus.

BRIEF DESCRIPTION OF DRAWINGS

Example embodiments of the present invention will become more apparent by describing in detail example embodiments of the present invention with reference to the accompanying drawings, in which:

FIG. 5 is a flowchart illustrating an operation theory of a charger detection apparatus according to another embodiment of the present invention;

DESCRIPTION OF EXAMPLE EMBODIMENTS

Figure 1:
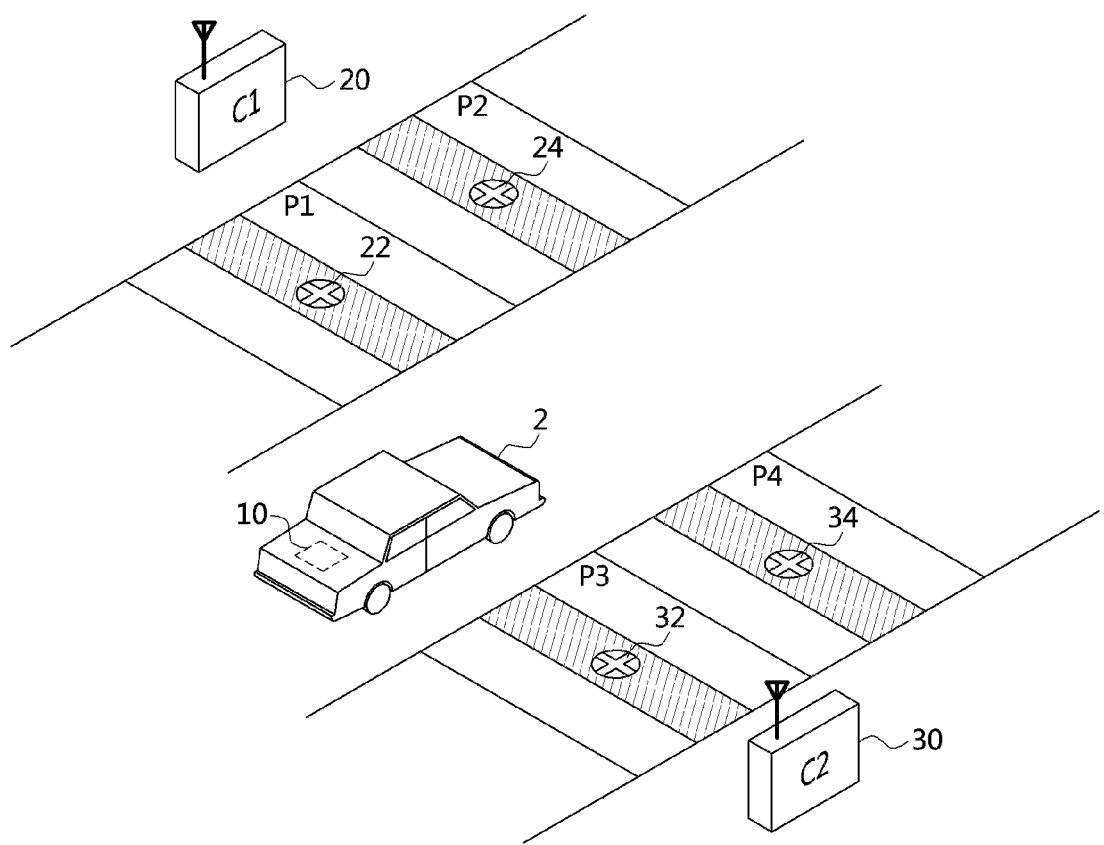
FIG. 1 is a schematic diagram of a charging station capable of employing a charger detecting method according to one embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present invention, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present invention. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Hereinafter, example embodiments of the present invention will be described in detail with reference to the attached drawings.

FIG. 1 is a schematic diagram of a charging station capable of employing a charger detecting method according to one embodiment of the present invention.

Referring to FIG. 1, the charging station according to the present embodiment includes one or more chargers and a plurality of transmitting pads.

In the present embodiment, the one or more chargers may include a first charger C1 20 and a second charger C2 30 and the first charger 20 and the second charger 30 may be configured to be connected to a transmitting coil of at least one transmitting pad and to control power supplied to the transmitting pad which transmits wireless power to a receiving pad.

The plurality of transmitting pads may include a first transmitting pad 22, a second transmitting pad 24, a third transmitting pad 32, and a fourth transmitting pad 34. The first transmitting pad 22 may be disposed in a first parking area P1, the second transmitting pad 24 may be disposed in a second parking area P2, the third transmitting pad 32 may be disposed in a third parking area P3, and the fourth transmitting pad 34 may be disposed in a fourth parking area P4.

When a vehicle 2 loaded with a charger detection apparatus 10 enters a service area or a network of the charging station, the charger detection apparatus 10 may detect a most appropriate charger or a certain transmitting pad of the charger for the vehicle 2 to be wirelessly charged while communicating at least one charger to allow the vehicle 2 to effectively follow a wireless charging process.

Figure 2:
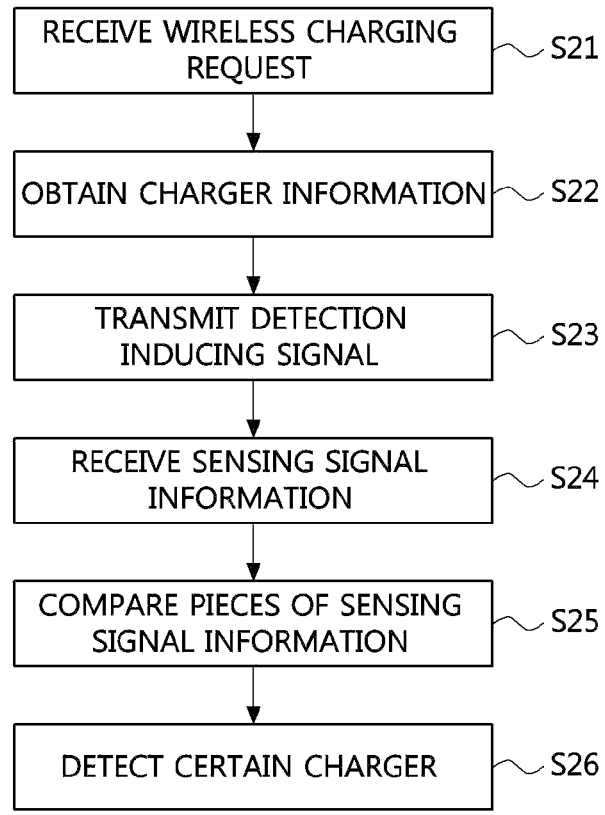
FIG. 2 is a flowchart illustrating the employable charger detecting method for the charging station of FIG. 1 according to one embodiment of the present invention.

FIG. 2 is a flowchart illustrating the employable charger detecting method for the charging station of FIG. 1 according to one embodiment of the present invention.

Referring to FIG. 2, the charger detecting method according to the present embodiment may start as a vehicle enters a wireless charging service area or a wireless charging network of a charging station and a wireless charging request signal is received at a vehicle controller or a wireless charging control apparatus of the vehicle from a user (S21).

When a wireless charging request is received, a charger detection apparatus loaded in the vehicle opens a communication channel with at least one charger in the charging station and obtains charger information (S22). The communication channel between the charger detection apparatus and the charger may be open by a detection inducing signal of the charger detection apparatus, a beacon signal of the charger, etc. Also, the charger information may include identification information of the charger and at least one transmitting pad connected to the charger and information on whether a wireless charging service is available now.

When at least one charger and at least one transmitting pad are detected, the charger detection apparatus transmits the detection inducing signal for detecting a plurality of transmitting pads using a receiving coil of a receiving pad installed in the vehicle as a wireless communication antenna (S23).

The detection inducing signal may be embodied based on a micro current considering configuration efficiency and operation efficiency of the charger detection apparatus. The micro current indicates a current at a considerably small level, which may be smaller than a minimum current among rated normal currents received at the receiving pad while wirelessly charging. For example, the micro current may be about $\frac{1}{10}$ of the minimum current in a normal wireless charging state or less.

Also, when transmitting the detection inducing signal, a signal generation portion of the charger detection apparatus may transmit a plurality of detecting inducing signals for a certain time. In this case, the charger which receives the plurality of detection inducing signals may generate pieces of sensing signal information using an average or a weighted average of signal-receiving intensities of the plurality of detection inducing signals and may provide the charger detection apparatus with feedback on the generated pieces of sensing signal information, thereby supporting an operation of the charger detection apparatus.

Next, the charger detection apparatus may receive the pieces of sensing signal information from at least one charger and the pieces of sensing signal information from the plurality of chargers (S24). When one charger manages a plurality of transmitting pads, the pieces of sensing signal information from each thereof may substantially include pieces of sensing signal information on the plurality of transmitting pads.

Next, the charger detection apparatus compares the pieces of sensing signal information (S25). The sensing signal information may be compared with preset reference values or with one another. Also, the charger detection apparatus detects a certain charger (hereinafter referred to as a first charger) or a certain transmitting pad (hereinafter referred to as a first transmitting pad), which has a preset priority among the at least one charger and the plurality of transmitting pads depending on a result of comparing sensing signals (S26).

Figure 3:
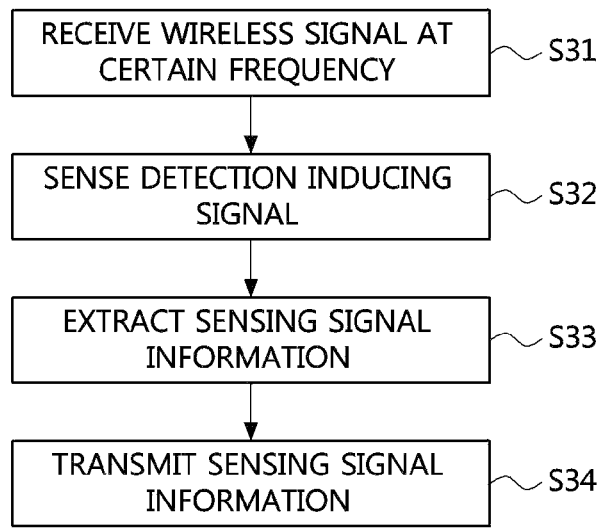
FIG. 3 is a flowchart illustrating an employable charger operating method for the charging station of FIG. 1 according to one embodiment of the present invention.

FIG. 3 is a flowchart illustrating an employable charger operating method for the charging station of FIG. 1 according to one embodiment of the present invention. FIG. 4 is a view illustrating data formats of available sensing signal information for the charger operating method of FIG. 3.

Referring to FIG. 3, in the charger operating method according to the present embodiment, the charger installed in the charging station receives a wireless signal at certain frequency through at least one transmitting pad connected to the charger in a standby mode or active mode (S31). The wireless signal may be a detection inducing signal or a radio frequency signal including the detection inducing signal transmitted by the charger detection apparatus.

When the wireless signal is received, the charger senses the detection inducing signal of the charger detection apparatus, included in the wireless signal (S32). The charger may sense the detection inducing signal based on a preset or stored identifier of the detection inducing signal.

Next, the charger extracts the sensing signal information which includes signal-receiving intensity of the detection inducing signal according to request information or a request message for the sensing signal information included in the detection inducing signal (S33). Also, the charger may transmit the extracted sensing signal information to the charger detection apparatus (S34). The charger may transmit the sensing signal information through a wireless communication channel with the charger detection apparatus, which is previously opened.

The sensing signal information described above may be formed of a first data format F1, a second data format F2, a third data format F3, or a combination thereof.

Figure 4A:
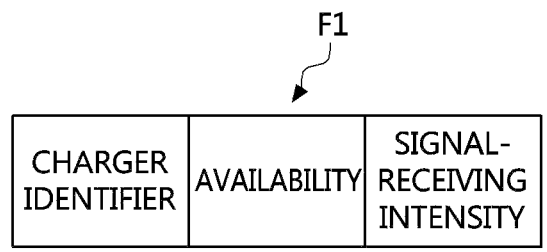
FIGS. 4(a), 4(b), and 4(c) are views illustrating available data formats of pieces of sensing signal information in the charger operating method of FIG. 3.
Figure 4B:
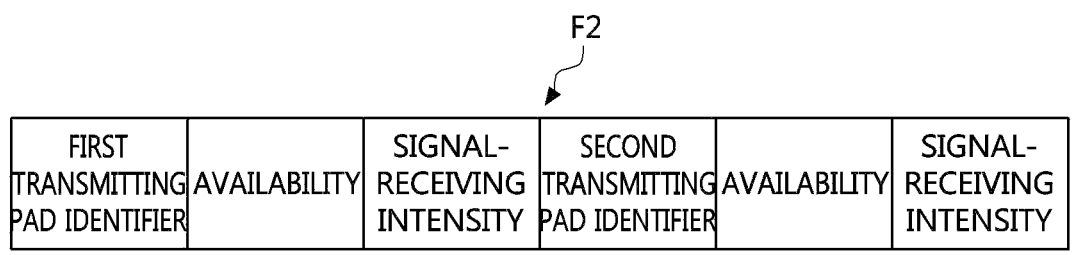
Figure 4C:
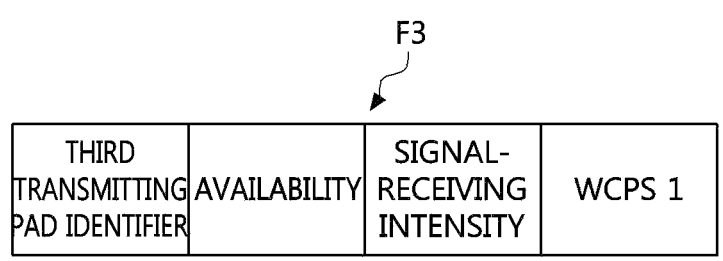

For example, as shown in FIGS. 4(a), 4(b), and 4(c), the sensing signal information which has the first data format F1 may include information on a charger identifier, information on whether the charger is available, and information on signal-receiving intensity.

Also, as shown in FIG. 4(b), the sensing signal information which has the second data format F2 may include information on a first transmitting pad identifier, information on whether a first transmitting pad is available, information on signal-receiving intensity at the first transmitting pad, information on a second transmitting pad identifier, information on whether a second transmitting pad is available, information on signal-receiving intensity at the second transmitting pad.

Also, as shown in FIG. 4(c), the sensing signal information which has the third data format F3 may include information on a third transmitting pad identifier, information on whether a third transmitting pad is available, information on signal-receiving intensity at the third transmitting pad, and information on a wireless charging priority serial (WCPS) number of the third transmitting pad. In the present embodiment, the third transmitting pad is a transmitting pad having a first WCPS number WCPS 1 among available transmitting pads managed by the charging station in real time. In this case, the charger detection apparatus may determine a transmitting pad which has the first WCPS number among transmitting pads which have signal-receiving intensity of a reference value or more as a wireless charging transmitting pad.

FIG. 5 is a flowchart illustrating an operation theory of a charger detection apparatus 10 according to another embodiment of the present invention.

Referring to FIG. 5, the charger detection apparatus 10 may receive beacon signals from a plurality of chargers 20 and 30 in a charging station (S41 and S42). The beacon signal may include charger information. The charger information may include information on a charger identifier and information on availability thereof or may include information on an identifier of a transmitting pad connected to a charger and information on availability thereof.

Next, the charger detection apparatus 10 extracts the charger information (S43), generates a detection inducing signal to be transmitted to the plurality of transmitting pads (S44), and transmitting the generated detection inducing signal to a plurality of transmitting pads connected to the plurality of chargers 20 and 30 (S45).

When the detection inducing signal is received (S46), the first charger 20 extracts sensing signal information (hereinafter referred to as first sensing signal information) which includes signal-receiving intensity with respect to the detection inducing signal (S48) and transmits the extracted first sensing signal information to the charger detection apparatus 10.

Similar to this, when the detection inducing signal is received (S47), the second charger 30 extracts sensing signal information (hereinafter referred to as second sensing signal information) which includes signal-receiving intensity with respect to the detection inducing signal (S49) and transmits the extracted second sensing signal information to the charger detection apparatus 10.

Next, the charger detection apparatus 10 compares the first sensing signal information with the second sensing signal information which are received (S50). The comparison between the first sensing signal information and the second sensing signal information may be performed by comparing signal-receiving intensities of the chargers and transmitting pads available for wireless charging based on the information on availability thereof. Surely, according to implementation, the charger detection apparatus 10 may perform the comparison by referring to WCPS numbers provided by the charging station, in addition to the comparison of the signal-receiving intensities.

Next, the charger detection apparatus 10 detects a certain charger most appropriate for wireless charging of the vehicle or a certain transmitting pad of the certain charger (S51). Also, the charger detection apparatus 10 may transmit a wireless charging requirement to a charger which manages a finally selected transmitting pad. The wireless charging requirement may be a condition which provides optimal power transmitting efficiency at a receiving pad of the vehicle while wirelessly charging, and for example, may be a condition which includes information on an allowable current, voltage, and power at the receiving pad, duration, a start time, or combination thereof.

Figure 6:
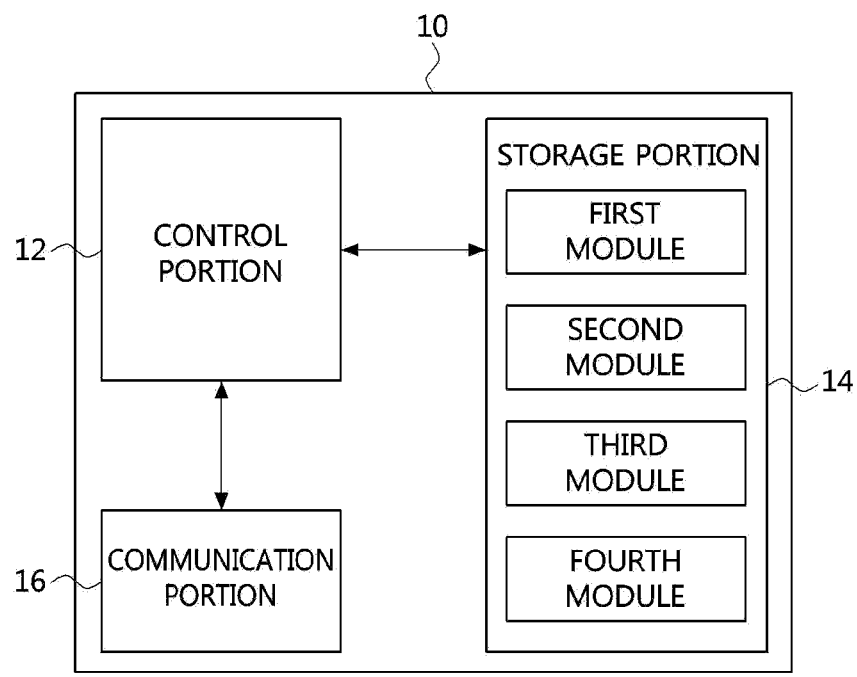
FIG. 6 is a block diagram illustrating an employable configuration for the charger detection apparatus of FIG. 5.

FIG. 6 is a block diagram illustrating an employable configuration for the charger detection apparatus 10 of FIG. 5.

Referring to FIG. 6, the charger detection apparatus 10 according to the present embodiment includes a control portion 12, a storage portion 14, and a communication portion 16.

The control portion 12 may receive, as a controller, charger information from at least one charger present within a network area of a vehicle; transmit, as the controller, a sensed current from a receiving pad of the vehicle to the charger or a charger side transmitting pad based on the charger information at the charger; and determine, as the controller, the charger and the transmitting pad that has priority based on a voltage and a current induced by the sensed current.

The control portion 12, like a processor, may include one or more cores, a cache memory, a memory interface, and a peripheral interface. The peripheral interface may connect the control portion 12 with an input/output system and several other peripheral devices. The memory interface may connect the control portion 12 with the storage portion 14.

When the control portion 12 includes a multi-core structure, the control portion 12 may be formed by integrating two or more independent cores into one package formed of a single integrated circuit. Also, the control portion 12 may include a central processing unit (CPU). The CPU may be formed as a system on chip (SoC) in which a micro control unit (MCU) and a peripheral device that is an integrated circuit for an external expansion device are arranged together but is not limited thereto. Also, the control portion 12 may include a register which stores a command to be processed, an arithmetic logical unit (ALU) which performs comparison, determination, and calculation, an internal control unit which internally controls the core to analyze and execute the command, and an internal bus.

Also, the control portion 12 may include one or more data processors, image processors, or coder-decoders (CODEC) but is not limited thereto. The data processor, image processor, or CODEC may be an additional component connected to the control portion 12.

The control portion 12 described above may perform data input, data processing, data output to perform the secondary charging pad alignment method by executing several software programs. Also, the control portion 12 may operate a particular software module (an instruction set) stored in the storage portion 14 and may perform several particular functions corresponding to the corresponding module. That is, the control portion 12 may be provided to perform the secondary charging pad alignment method using software modules stored in the storage portion 14 and to perform wireless communication with a charger through the communication portion 16.

The storage portion 14 may store programs or modules for performing the charger detecting method. Also, the storage portion 14 may store charger information and may store sensing signal information received from the charger. Also, the storage portion 14 may store a set value of priority. The set value of priority may be set to consider an internal reference, a station reference, or a combination thereof.

The storage portion 14 may include a memory. The memory may include a storage medium having the form of a volatile memory such as a random access memory (RAM) and a read-only memory (ROM) or a nonvolatile memory. Also, the storage portion 14, depending on implementation, may include a storage medium such as a floppy disc, a hard disc, a magnetic tape, a compact disc (CD) ROM, and a flash memory.

In the present embodiment, the storage portion 14 may include a first module, a second module, a third module, and a fourth module. The first module may correspond to a module for searching for at least one charger. The second module may correspond to a module for generating a detection inducing signal. The third module may correspond to a module for receiving detection signal information. The fourth module may correspond to a module for detecting one of a first charger and a first transmitting pad. Also, the storage portion 14, according to implementation, may further store a module for transmitting the wireless charging requirement of the receiving pad to the first charger.

The communication portion 16 may include a communication interface or a communication module. The communication interface may support one or more communication protocols to allow a secondary charging pad alignment apparatus to be connected with the charger, a central processing unit (CPU) of a charging station, or other apparatuses on other networks through the network. Also, the communication portion 16 may include one or more wireless communication subsystems. The wireless communication subsystem may include a radio frequency receiver, a radio frequency transceiver, an optical receiver, for example, an infrared receiver, an optical transceiver, or a combination thereof.

A network accessible by the communication portion 16 describe above, for example, may include a global system for mobile communication (GSM), enhanced data GSM environment (EDGE), code division multiple access (CDMA), wideband CDMA (WCDMA), long term evolution (LTE), LTE-advanced (LTE-A), orthogonal frequency division multiple access (OFDMA), WiMAX, wireless fidelity (Wi-Fi), Bluetooth, etc.

Figure 7:
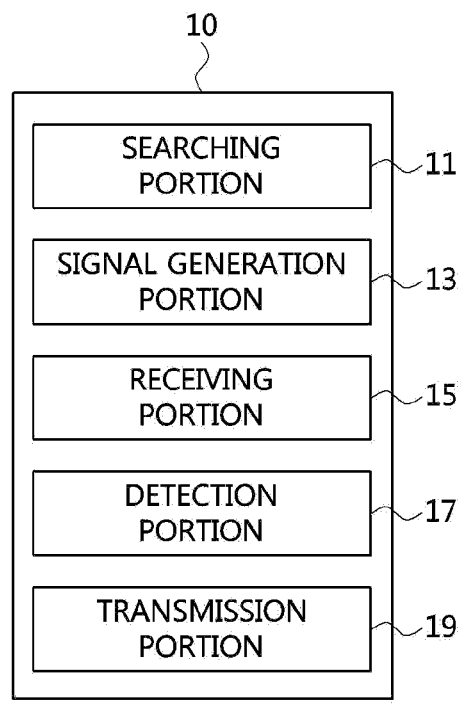
FIG. 7 is a block diagram illustrating another employable configuration for the charger detection apparatus of FIG. 5.

FIG. 7 is a block diagram illustrating another employable configuration for the charger detection apparatus 10 of FIG. 5.

Referring to FIG. 7, the charger detection apparatus 10 according to the present embodiment may include a searching portion 11, a signal generation portion 13, a receiving portion 15, a detection portion 17, and a transmission portion 19.

The searching portion 11 may transmit a search request signal to at least one charger or a plurality of transmitting pads located in a wireless charging service area or a wireless charging network in a charging station and may receive a search response signal for the search request signal from the at least one charger. Also, the searching portion 11, according to implementation, may receive a beacon signal from the at least one charger. The searching request signal or beacon signal may include charger information.

The signal generation portion 13 may transmit a detection inducing signal through a wireless charging receiving pad loaded in a vehicle. The signal generation portion 13 may generate the detection inducing signal using a micro current, and according to to implementation, may operate to transmit the plurality of detection inducing signals for a certain time.

The receiving portion 15 may receive sensing signal information for the detection inducing signal received at a plurality of transmitting pads from the at least one charger in the charging station. The receiving portion 15 may include a communication controller which is connected to a communication portion and controls at least some functions of the communication portion to receive the detection inducing signal.

The detection portion 17 may include a device for detecting at least one charger or at least one transmitting pad by comparing sensing signal information each thereof or a component which performs a function corresponding to the device. The detection portion 17 may finally determine a first charger or a first transmitting pad according to a priority stored in a storage portion or preset.

The transmission portion 19 may include a device for transmitting a wireless charging requirement of the receiving pad to the first charger after the first charger or the first transmitting pad is detected or a component which performs a function corresponding to the device. The transmission portion 19 may operate to transmit the wireless charging requirement stored in the storage portion to the first charger through the communication portion.

The searching portion 11, the signal generation portion 13, the receiving portion 15, the detection portion 17, and the transmission portion 19, which are described above, may be devices provided in the control portion of the charger detection apparatus 10 or components which perform functions corresponding to the respective devices. That is, the searching portion 11, the signal generation portion 13, the receiving portion 15, the detection portion 17, or the transmission portion 19 may be provided to be loaded in a certain operation space of the control portion of the charger detection apparatus 10 to perform a corresponding function by executing, by at least a part of the control portion, at least one module stored in the storage portion.

Figure 8:
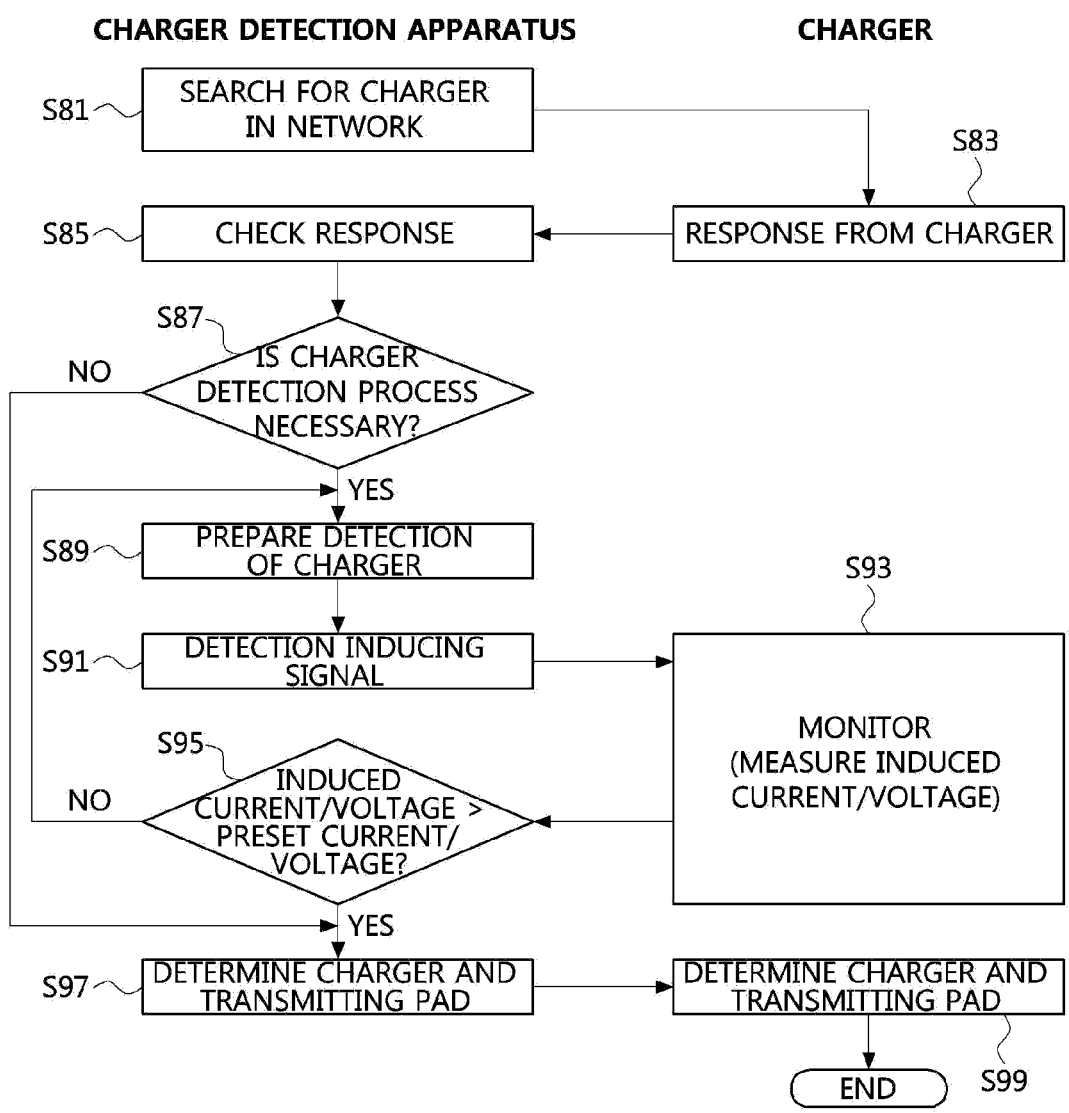
FIG. 8 is a flowchart illustrating an operation theory of a charger detection apparatus according to still another embodiment of the present invention.

FIG. 8 is a flowchart illustrating an operation theory of a charger detection apparatus according to still another embodiment of the present invention.

Referring to FIG. 1, the charger detection apparatus according to the exemplary embodiment of the present invention may search for a charger present within a network area, which may be detected by a vehicle (S81). In other words, a signal confirming whether the charger is present within the network area may be transmitted to a charger. When the charger, which may be present within the network area of the vehicle, transmits charger information in response to the signal (S83) and the vehicle receives the charger information (S85), a sensed current may be transmitted from a receiving pad to the charger or a charger transmitting pad based on the charger information (S91).

The charger and the transmitting pad that has priority may be determined based on a voltage or a current induced by the sensed current transmitted from the vehicle (S97 and S99). When the vehicle detects the charger and the transmitting pad (S97), the vehicle may transmit that information to the charger and the charger may also detect the charger and the transmitting pad (S99).

More particularly, the charger information received from the charger may include a unique identifier (ID) of a charger, a number of chargeable transmitting pads, an availability of the transmitting pad a type (e.g., singular or double) of the transmitting pad, a number of transmitting pads per charger, and the like. The unique identifier of the charger may be a Mac address within the Ethernet. Whether a charger detection process, which helps a vehicle detect an optimal charger, is required may be determined (S87).

When one charger or transmitting pad is available or detected, the charger detection process may be determined to be unnecessary and a controller may be configured to select the corresponding charger and transmitting pad as a charger for a vehicle (S97). In addition, communication with the selected charger may be established. Alternatively, when more than one charger or transmitting pad is detected, the charger detection process (S89 to S95), which detects the optimal charger for the corresponding vehicle, may be executed.

When the charger detection process is executed, the controller may be configured to transmit information regarding a current, a voltage, power, duration, or start time from the receiving pad of the vehicle to the plurality of chargers or transmitting pads to prepare the charger detection (S89). Additionally, the vehicle controller may be configured to transmit a minimal sensed current (e.g., enough to induce a voltage from the transmitting pad to the charger or the transmitting pad) (S91). The minimal sensed current may be a current of about 1/10 of a normal current value which is transmitted in a normal state (e.g., when a vehicle operates without detecting a charger or charging pad).

The charger measures the current and the voltage induced from each transmitting pad and monitors the measured current and voltage (S93). In addition, the charger may be configured to transmit the measured induced current and voltage to the vehicle. For example, when one charger has a plurality of transmitting pads, the charger may indicate from which one of the transmitting pads the current, voltage, and power values are from and may transmit the indicated value to the vehicle. Further, the controller may be configured to compare the induced current, voltage, and power with a preset current, voltage, and power (S95) to determine the charger and the transmitting pad that has priority when the induced current, voltage, and power are greater than the preset value (S97). In other words, when the magnitude of the induced current, voltage, and power is greater than the preset value, the corresponding charger may be set as a charger for a vehicle and may increase charging efficiency.

Further, to reflect a distance between the vehicle and the charger or the transmitting pad, signal attenuation from the charger or the transmitting pad may also be determined. Accordingly, when more than one charger or transmitting pad is present where the induced current, voltage, and power are greater than the preset values for each of the chargers and the transmitting pads, the signal attenuation from the charger may be determined. Further, the charger and the transmitting pad may be selected based on a physical distance between the charger or the transmitting pad and the vehicle.

Figure 9:
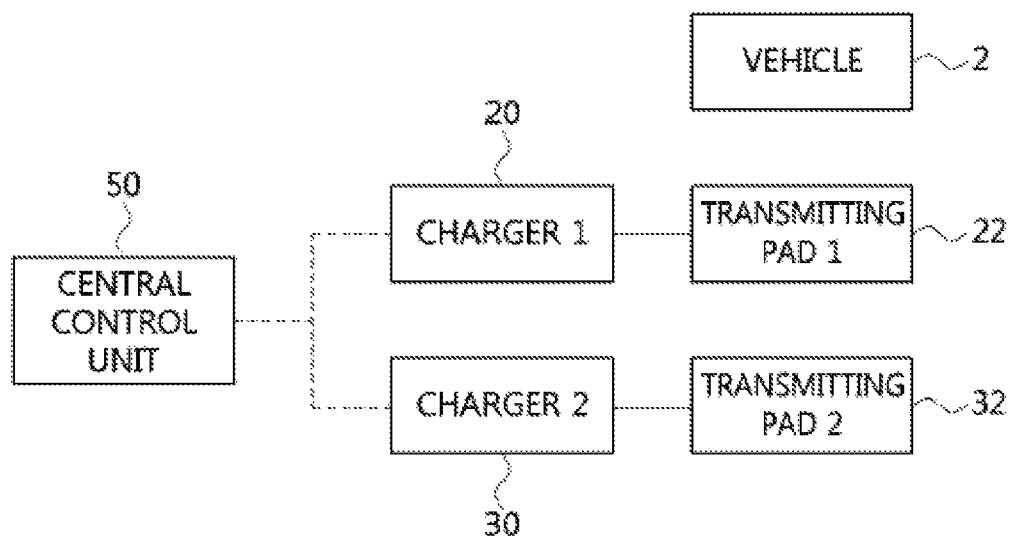
FIG. 9 is a view illustrating a plurality of chargers and a plurality of transmitting pads as a modified example of the charging station of FIG. 1.
Figure 10:
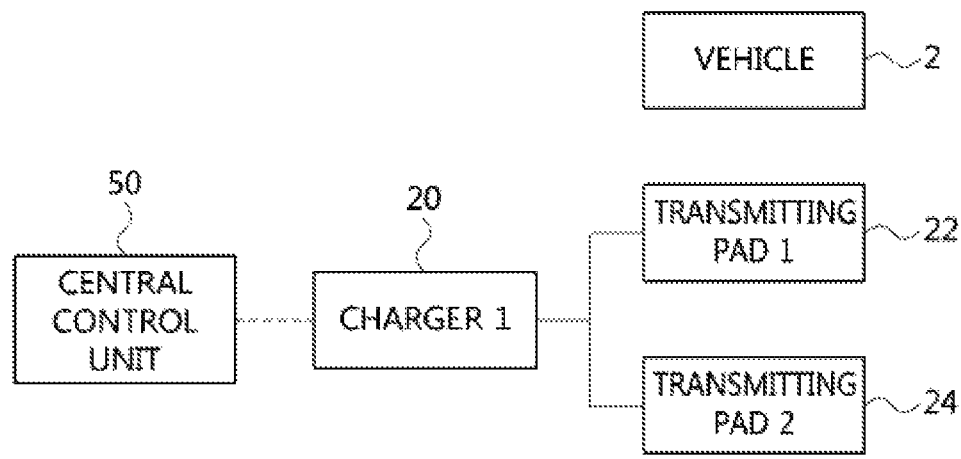
FIG. 10 is a view illustrating a single charger and a plurality of transmitting pads as another modified example of the charging station of FIG. 1.

FIG. 9 is a view illustrating a plurality of chargers and a plurality of transmitting pads as a modified example of the charging station of FIG. 1, and FIG. 10 is a view illustrating a single charger and a plurality of transmitting pads as another modified example of the charging station of FIG. 1.

In the embodiment, the chargers in the charging system may be connected to each other via a smart grid and a central controller 50 may be configured to operate the plurality of chargers via power line communication.

Referring to FIG. 9, when the plurality of chargers 20 and 30 are mounted in parallel within a public parking lot, the vehicle 2 may be configured to detect the identifier information of the charger which is present within the network area. In other words, the vehicle may not appreciate which one of the chargers the vehicle is charging the vehicle or which one of the chargers is located at a shortest distance from the vehicle.

Referring to FIG. 10, when two transmitting pads 25 and 27 that belong to one charger 20 are detected, which one of the transmitting pads optimally charges the vehicle may be determined and then a connection between the determined transmitting pads 25 and 27 and the receiving pads of the vehicle may be set up.

As the described above, a charging station arranged the plurality of the chargers or the plurality of the transmitting pads is required to detect an optimal charger or an optimal transmitting pad.

Figure 11:
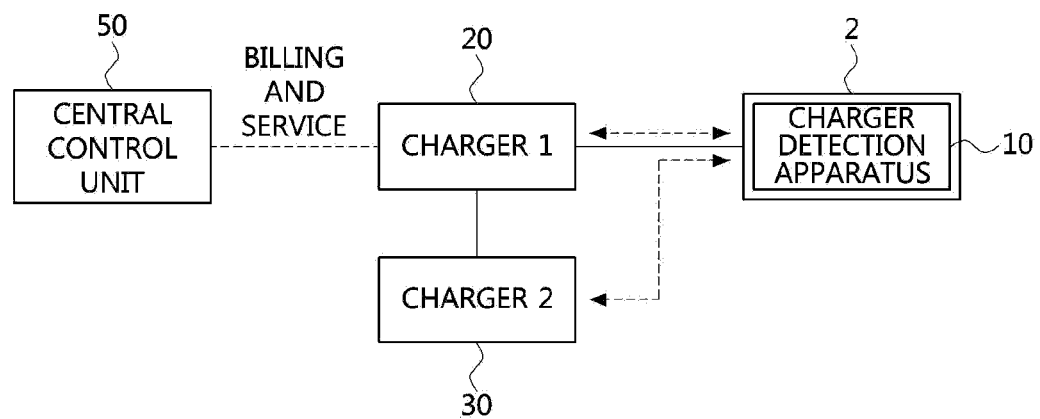
FIG. 11 is a view illustrating an example of coupling between the charger detection apparatus and the plurality of chargers according to the embodiment of the present invention.
Figure 12:
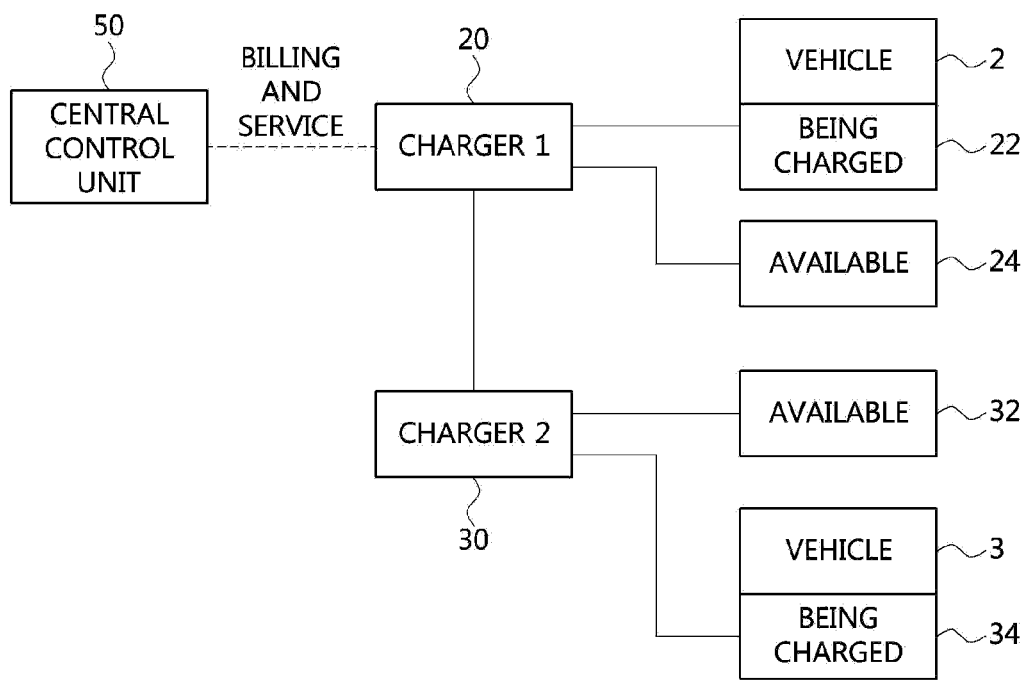
FIG. 12 is a view illustrating another example of coupling between the charger detection apparatus and the plurality of chargers according to the embodiment of the present invention.

FIG. 11 is a view illustrating an example of coupling between the charger detection apparatus and the plurality of chargers according to the embodiment of the present invention, and FIG. 12 is a view illustrating another example of coupling between the charger detection apparatus and the plurality of chargers according to the embodiment of the present invention.

Referring to FIG. 11, which one of the chargers 20 and 30 of the vehicle 2 is nearest based on the attenuation of the signal transmitted from the chargers 20 and 30 may be determined.

Further, as illustrated in FIG. 12, when the plurality of chargers 20 and 30 and the plurality of transmitting pads in each charger are mounted in a charging station, the charger detection apparatus of the vehicle 2 or 3 may be configured to receive the information regarding the available chargers and transmitting pads to detect the optimal charger and transmitting pad.

According to the exemplary embodiments of the present invention, the method for detecting a charger may determine the charger or the charging pad with an optimal efficiency, located nearest to the vehicle, or may be used based on driver intention, when charging the vehicle in the charging station in which the plurality of chargers or the plurality of charging pads are mounted and may charge the vehicle using the detected charger.

As described above, in the charging station in which the plurality of chargers or the plurality of transmitting pads are arranged, it is necessary to detect an optimal charger and charging pad.

According to the present embodiment in this specification, the charger detection apparatus may detect the optimal charger or transmitting pad among the available chargers or transmitting pads through damping ratios of signals from the plurality of chargers.

Figure 13:
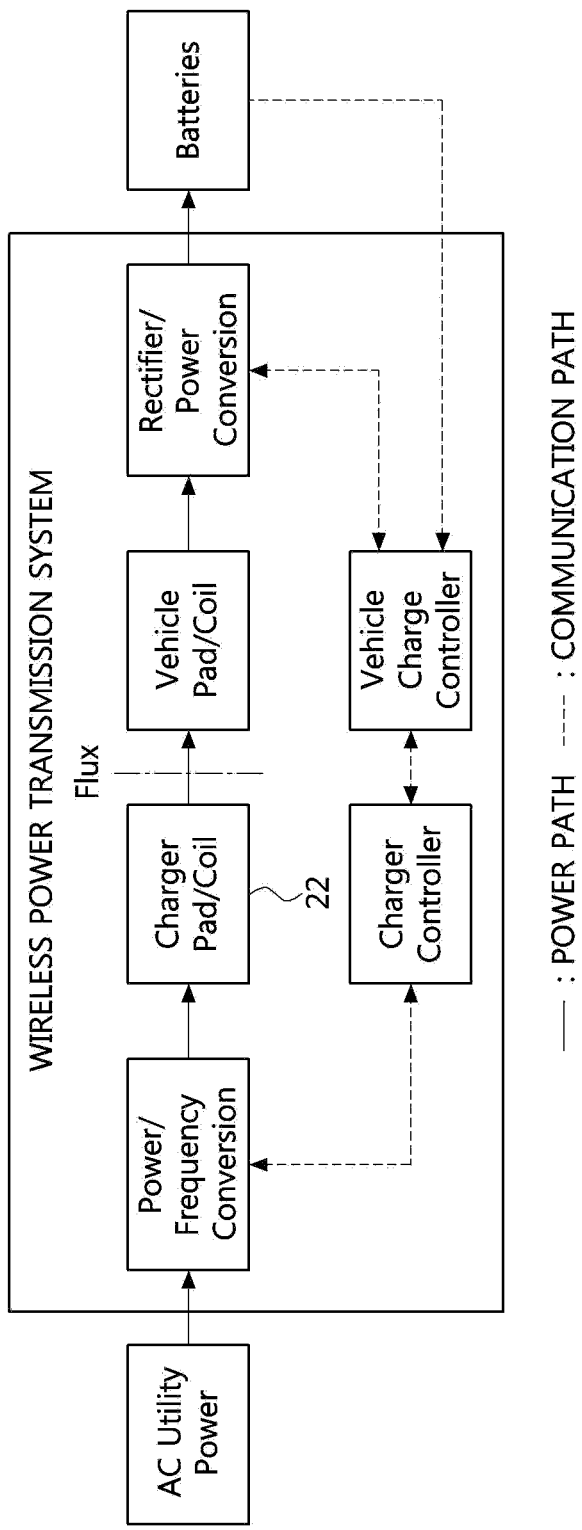
FIG. 13 is a view of a wireless power transmission system to which the charger detecting method according to the embodiment of the present invention may be applied.

FIG. 13 is a view of a wireless power transmission system to which the charger detecting method according to the embodiment of the present invention may be applied.

Referring to FIG. 13, in the wireless power charging system to which the charger to detecting method is applied, an electric vehicle may allow batteries to be charged by receiving power from a charger pad or coil of a charging station without a contact device. A high level operation in a closed-loop charging system will be described as follows.

A vehicle charge controller may determine currents for the batteries depending on states of the batteries. The vehicle charge controller may be included in the charger detection apparatus described above or may include the charger detection apparatus. The vehicle charge controller may transmit a charger output power request to a charger or a charger controller through a communication path or a communication interface.

Next, the charger may control input currents of alternating current utility power from a power utility provider based on the charger output power request from the vehicle charge controller. The charger may convert the alternating current utility power of 50/60 Hz into high frequency alternating current (HFAC) power through power/frequency conversion.

According to a flux of alternating currents, the HFAC power is transmitted from a primary charger pad/coil 22 to a secondary vehicle pad/coil through magnetic coupling. The primary charger pad/coil 22 may be corresponded to the transmitting pad/coil of the charger. The HFAC power induced by a second side may be rectified or filtered through a rectifier or a power conversion process according to the control of the vehicle charge controller and may be adjusted to a direct current (DC) of a voltage appropriate for charging a vehicle battery. The operations described above may be repetitively performed until the vehicle charge controller determines full charge of the batteries.

According to the charger detection method and apparatus and the charger operating method as described above, when a vehicle is about to use a wireless charging service in a charging station, the charger detection apparatus in the vehicle may detect a charger or transmitting pad which has most excellent efficiency, is located in a most adjacent place, or is available at a desirable time among at least one charger or a plurality of transmitting pads, thereby effectively performing wireless charging.

Also, while a receiving coil of a receiving pad loaded in the vehicle is used as a wireless communication antenna, a micro current is allowed to flow through the receiving coil to sense a voltage or current induced by the plurality of transmitting pads. Sensing signal information is obtained from a charger connected with at least one transmitting coil. A charger or transmitting pad which has a high priority is determined based on the sensing signal information. Accordingly, it is possible to easily and effectively detect the charger.

Also, while searching for the at least one charger or the plurality of transmitting pads, a detection inducing signal using a micro current is repetitively transmitted, thereby calculating sensing signal information using an average or a weighted average of the plurality of detection inducing signals. Accordingly, a difference in signal-receiving intensity according to a peripheral environment or a change in the peripheral environment is reduced, thereby increasing reliability in the sensing signal information and finally increasing reliability and stability of the charger detecting method.

Also, while determining the charger or transmitting pad having the priority based on the sensing signal information, in addition to a method of selecting a charger or transmitting pad having the greatest signal-receiving sensitivity in the sensing signal information, it is possible to select a transmitting pad or charger having a first serial number in priority serial numbers preset by a central control unit of the charging station among the at least one charger and the plurality of transmitting pads having the sensing signal information of a reference value or more. Accordingly, a situation of the charging station is considered in a detection process of the charger detection apparatus of the vehicle, thereby flexibly adapting various wireless charging conditions.

While the example embodiments of the present invention and their advantages have been described in detail, it should be understood that various changes, substitutions and alterations may be made herein without departing from the scope of the invention.

What is claimed is:

1. A method of detecting one charger of a plurality of chargers in a charging station and a transmitting pad connected to said one charger using a charger detection apparatus loaded in a vehicle, the method comprising:
   transmitting a detection inducing signal through a receiving pad loaded in the vehicle for wireless charging;
   receiving pieces of sensing signal information on the detection inducing signal received at a plurality of transmitting pads of at least one charger in the charging station from the at least one charger; and
   detecting a first charger having a preset priority among the at least one charger and the plurality of transmitting pads and a first transmitting pad connected to the first charger by comparing the pieces of sensing signal information.

2. The method of claim 1, wherein in the transmitting of the detection inducing signal, a signal generation portion connected to the receiving pad uses a receiving coil of the receiving pad as a wireless communication antenna, and
   wherein a level of the detection inducing signal is smaller than that of a lowest rated current induced by the receiving pad when performing wireless charging.

3. The method of claim 1, wherein in the transmitting a detection inducing signal, the detection inducing signal is transmitted for a first time in a first time cycle, and is then it is repetitively transmitted for a plurality of times in a second time cycle which is longer than the first time in the first time cycle.

4. The method of claim 1, before the detecting of one of the first charger and the first transmitting pad, further comprising receiving a beacon signal from the at least one charger by using a searching portion of the charger detection apparatus,
   wherein the beacon signal comprises charging information and the charging information comprises identification information and availability information on one of the at least one charger and the plurality of transmitting pads.

5. The method of claim 1, before the detecting of one of a first charger and a first transmitting pad, further comprising:
   transmitting, by the searching portion of the charger detection apparatus, a searching request signal to one of the at least one charger and the plurality of transmitting pads located in one of a service area and a network in the charging station; and
   receiving a searching response signal for the searching request signal from the at least one charger,
   wherein the searching response signal comprises charger information, and the charger information comprises identification information and availability information on one of the at least one charger and the plurality of transmitting pads.

6. The method of claim 1, wherein the preset priority comprises a first serial number among priority serial numbers given to the plurality of transmitting pads in real time.

7. The method of claim 1, after the detecting of one of a first charger and a first transmitting pad, further comprising transmitting a wireless charging requirement of the receiving pad to the first charger.

8. A charger detection apparatus comprising:
a signal generation portion which transmits a detection inducing signal through a receiving pad loaded in a vehicle for wireless charging;
a receiving portion which receives pieces of sensing signal information on the detection inducing signal received at a plurality of transmitting pads of at least one charger in a charging station from the at least one charger; and
a detection portion which detects a first charger having a preset priority among the at least one charger and the plurality of transmitting pads or a first transmitting pad connected to the first charger by comparing the pieces of sensing signal information.

9. The charger detection apparatus of claim 8, wherein the signal generation portion uses a receiving coil of the receiving pad as a wireless communication antenna, and
wherein a level of the detection inducing signal is smaller than that of a lowest rated current induced by the receiving pad when performing wireless charging.

10. The charger detection apparatus of claim 9, wherein the signal generation portion repetitively performs transmitting of the detection inducing signal for a first time in a first time cycle, and then for a plurality of times in a second time cycle which is longer than the first time in the first time cycle.

11. The charger detection apparatus of claim 8, further comprising a searching portion which receives a beacon signal from the at least one charger,
wherein the beacon signal comprises charger information, and the charger information comprises identification information and availability information on one of the at least one charger and the plurality of transmitting pads.

12. The charger detection apparatus of claim 8, further comprising a searching portion which transmits a searching request signal to one of the at least one charger and the plurality of transmitting pads located in one of a service area and a network in the charging station and receives a searching response signal for the searching request signal from the at least one charger,
wherein the searching response signal comprises charger information, and the charger information comprises identification information and availability information on one of the at least one charger and the plurality of transmitting pads.

13. The charger detection apparatus of claim 8, wherein the preset priority is determined based on availability information and signal-receiving intensity of one of the charger and the transmitting pads in the pieces of sensing signal information.

14. The charger detection apparatus of claim 8, further comprising a transmission portion which transmits a wireless charging requirement of the receiving pad to the first charger after one of the first charger and the first transmitting pad is detected.

15. A charger operating method performed by each charger of a plurality of chargers in a charging station, the charger operating method comprising:
receiving, by at least one transmitting pad connected to said each charger, a detection inducing signal from a receiving pad loaded in the vehicle for wireless charging;
generating sensing signal information on the detection inducing signal to support detecting a first charger having a preset priority among at least one charger and a plurality of transmitting pads in the charging station and a first transmitting pad connected to the first charger; and
transmitting the sensing signal information to a charger detection apparatus loaded in the vehicle.

16. The charger operating method of claim 15, further comprising, before the receiving of the detection inducing signal, transmitting a beacon signal which comprises charger information,
wherein the beacon signal comprises charger information, and the charger information comprises identification information and availability information on one of the at least one charger and the plurality of transmitting pads.

17. The charger operating method of claim 16, before the receiving of the detection inducing signal, further comprising:
receiving a searching request signal from the charger detection apparatus of the vehicle located in one of a service area and a network in the charging station; and
transmitting a searching response signal for the searching request signal to the charger detection apparatus,
wherein the searching response signal comprises charger information, and the charger information comprises identification information and availability information on one of the at least one charger and the plurality of transmitting pads.

18. The charger operating method of claim 15, wherein in the receiving of a detection inducing signal, one of a current and a voltage induced by the at least one transmitting pad is measured, and
wherein a level of the detection inducing signal is smaller than a level of a lowest rated normal current supplied to the at least one transmitting pad when performing wireless charging.

19. The charger operating method of claim 15, wherein in the receiving of a detection inducing signal, the detection inducing signal is received for a first time in a first time cycle, and then is repetitively received a plurality of times in a second time cycle, and
wherein the sensing signal information comprises one of an average and a weighted average of a plurality of received detection inducing signals.

20. The charger operating method of claim 15, after the transmitting the sensing signal information, further comprising receiving a message comprising a wireless charging requirement of the receiving pad from the charger detection apparatus.

* * * * *